June 23, 1925.  M. TATOSIAN  1,543,239
COMBINED SLED AND VELOCIPEDE
Filed Oct. 28, 1924
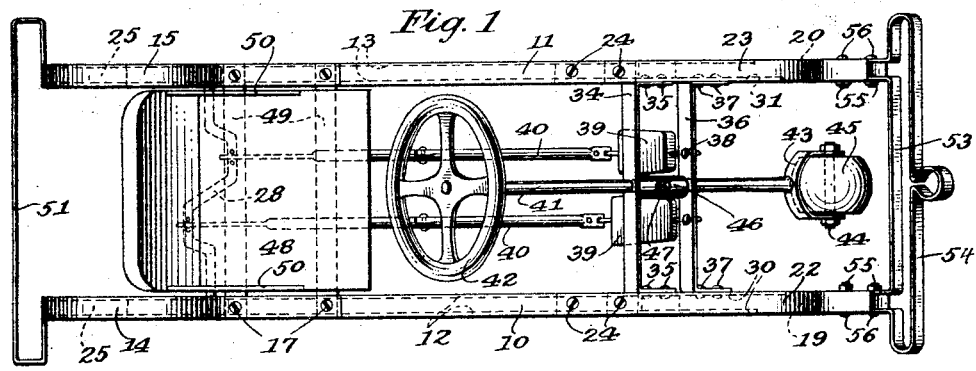
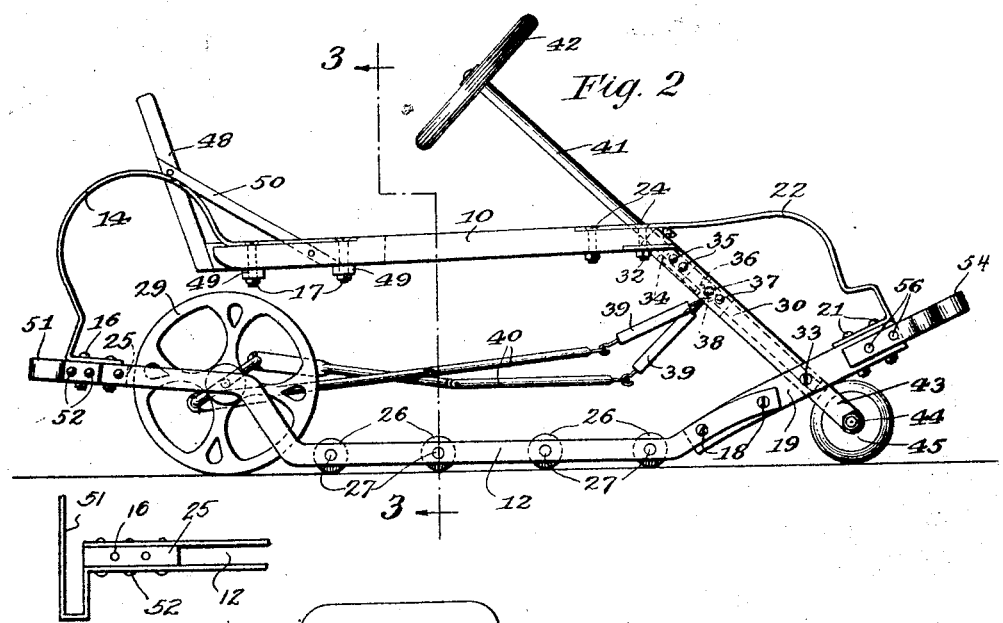
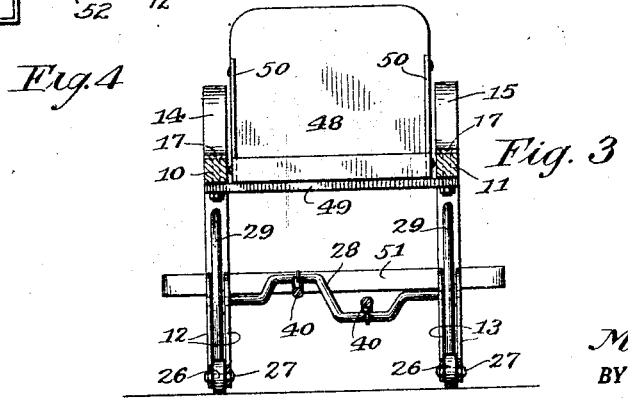
INVENTOR.
Martin Tatosian
BY
Chamberlain & Newman ATTORNEYS.

Patented June 23, 1925.

1,543,239

UNITED STATES PATENT OFFICE.

MARTIN TATOSIAN, OF BRIDGEPORT, CONNECTICUT.

COMBINED SLED AND VELOCIPEDE.

Application filed October 28, 1924. Serial No. 746,284.

*To all whom it may concern:*

Be it known that MARTIN TATOSIAN, a citizen of the United States, and resident of Bridgeport, in the county of Fairfield and State of Connecticut, has invented certain new and useful Improvements in Combined Sleds and Velocipedes, of which the following is a specification.

This invention relates to a combined sled and velocipede, adapted for use as an ordinary wheeled vehicle, or as a snow or ice sled.

The object of the invention is to provide a vehicle for ordinary use, as well as for use upon snow and ice which will be of novel and improved, and simple, durable and economic construction.

With the above and other objects in view, the invention comprises the construction, arrangement and combination of parts as now to be fully described and as hereinafter to be specifically claimed, it being understood that the disclosure herein is merely illustrative, slight changes in details of construction and arrangement of parts being permissible so long as within the spirit of the invention and the scope of the appended claims.

In the accompanying drawing forming a part of this specification,

Fig. 1 is a top plan view of the improved velocipede;

Fig. 2 is a side elevational view thereof;

Fig. 3 is a sectional view on line 3—3 in Fig. 2, looking in the direction of the arrows; and Fig. 4 is a detail plan view showing intersection of rear end of curved strips 12 with spring member 14 and block 25.

With respect to the drawing, the vehicle includes a pair of parallel, spaced apart upper rails 10 and 11, preferably of wood, and metal runners 12 and 13, each consisting of a pair of spaced apart metal strips adapted to have their lower edges in engagement with the ground when this is desirable, the strips 12 and 13 being curved upwardly at their rearward ends, where they are connected respectively to metal springs 14 and 15, as at 16, the opposite ends of said springs 14 and 15 being supports for the rearward portions of the upper rails and connected to said upper rails in any convenient manner, as at 17. The forward ends of the strips 12 and 13 are also curved upwardly and secured as at 18 to oblique rails denoted 19 and 20, said rails 19 and 20 preferably being parallel with each other. Each oblique rail supports, as at 21, a metal spring 22, 23 secured to the forward end portions of the upper rails 10 and 11, respectively, as at 24. The metal springs 14, 15 and 22, 23 are of any preferred construction to resiliently support the upper rails 10 and 11 from the metal runners and oblique rails of the vehicle. As disclosed, the springs 14 and 15 are duplicates, each consisting of a lower portion resting upon a metal runner, a portion approximately at right-angles to the metal runner and extending upwardly therefrom, and a bowed portion at the rear of the upper rails and having its forward end secured to a rail. The springs 22 and 23 are likewise duplicates, and each consists of a lower portion resting upon an oblique rail, a portion at right-angles to the oblique rail and extending upwardly therefrom, a portion above said lower portion and approximately parallel therewith, and a smoothly curved upper portion secured to an upper rail.

The two strips forming each of the runners are spaced apart at the forward end by the before mentioned oblique rails 19 and 20 to which they are secured and at the rear by blocks denoted 25, and rollers 26 are mounted between the strips of each runner, upon rivets 27, or the like, desirably passing through the strips.

Numeral 28 represents a crank shaft mounted in the inner strips of the metal runners 12, 13 to the rear of the upwardly curved portions of said runners, and 29 denotes rear wheels of the vehicle fixed to the opposite ends of the crank shaft and arranged between the strips of the different metal runners (see Fig. 3).

Near the front of the vehicle are oblique brace pieces 30 and 31 secured at their upper ends, as at 32, to the upper rails 10 and 11, respectively, and at their lower ends, as at 33, to the oblique rails 19 and 20, respectively. 34 is an upper cross brace having its ends secured to the oblique braces as at 35, and 36 is a lower cross brace having its ends secured to the oblique braces as at 37, said cross braces being adapted to together serve as a bracket for the steering column presently to be described, and the lower cross brace 36 having pivotally secured to it, as at 38, foot pedals 39. 40 represents links pivotally associated with the foot pedals and with the crank shaft.

Numeral 41 represents a steering column having a hand or steering wheel 42 at its upper end and a fork 43 at its lower end, the fork having a cross pin 44 between its legs upon which is mounted a relatively broad, round surfaced wheel 45. The steering column passes freely through the cross braces of the vehicle, as disclosed more clearly in Fig. 1, and slidable upon the column and extending the full distance between the cross braces is a collar 46 having a set screw 47 whereby the collar can be locked to the steering column. The cross braces provide spaced apart brackets for supporting and stabilizing the steering column, and by adjustably fixing the collar at any location along the length of the steering column, the front wheel can have any desired elevation with respect to the rear wheel.

When it is desired that the rollers 26, as well as the front and rear wheels, engage the ground, the steering column will be adjusted upwardly through the collar 46, as shown in Fig. 2, and when it is desired to elevate the rollers so that they will not engage the ground, the steering column will be set to a lower position with respect to the collar so as to slightly raise the runners from the ground and with respect to the position of the steering wheel. For use upon snow or ice, the arrangement can be that which will allow the rollers and runners to engage and slide along on said snow or ice.

Numeral 48 represents a seat with back supported between the upper rails by means of slats 49 held to the under faces of said rails by the bolts or other means securing said rear metal springs to said rails, the seat being attached to the slats in any convenient manner, and 50 denotes braces insuring the fixed relation of the seat to its back.

At the rear of the vehicle the metallic runners are fixed in spaced relation by means of a metallic piece 51 having its ends secured to the metallic runners as at 52, said metallic piece 51 being shaped to serve as a rear bumper for the vehicle, and at the front of the vehicle the oblique rails are fixed in spaced relation by means of two metallic pieces, denoted 53 and 54, respectively, one secured to the inner faces of the oblique rails as at 55, and the other secured to the outer faces of said rails as at 56, the two metallic pieces 53 and 54 being adapted to serve as a front bumper for the vehicle.

Having thus fully described the invention, what I claim as new and desire to secure by Letters Patent is:—

1. A sled of the character described, comprising spaced apart metallic runners each consisting of a pair of spaced apart strips having rollers between them, upper rails having a seat, metallic springs supporting said upper rails upon said metallic runners, rear wheels mounted in said metallic runners, means whereby said rear wheels can be rotated, a steering column supported from said upper rails, a front wheel upon said steering column, and means for adjusting said steering column upwardly and downwardly with respect to said upper rails, whereby said front and rear wheels and said rollers can engage the ground, or said rollers can be adjusted above the plane defined by the lower edges of said front and rear wheels.

2. A sled of the character described, comprising spaced apart metallic runners each consisting of a pair of spaced apart strips having rollers between them, oblique rails secured to the forward portions of said metallic runners, upper rails having a seat, metallic springs supporting said upper rails from said metallic runners and oblique rails, respectively, rear wheels mounted in said metallic runners, means whereby said rear wheels can be rotated, a steering column supported from said upper and oblique rails, a front wheel upon said steering column, and means for adjusting said steering column upwardly and downwardly with respect to said metallic rails.

3. The combination as specified in claim 2, wherein there is a bracket for the steering column consisting of oblique braces secured to said upper rails and oblique rails, respectively, and spaced apart cross braces between said oblique braces in which said steering column is rotatable and longitudinally slidable, and means for locking said steering column in said cross braces against longitudinal movement.

4. The combination as specified in claim 2, wherein the rear portions of the metallic runners and the front portions of the oblique rails are fixed in spaced relation by elements serving as rear and front bumpers for the sled.

Signed at Bridgeport, in the county of Fairfield and State of Connecticut, this 22nd day of October A. D., 1924.

MARTIN TATOSIAN.

Witnesses:
C. M. NEWMAN,
MIRIAM GODDARD.